Dec. 27, 1938.  W. F. GROENE ET AL  2,141,466
METHOD OF MACHINING CRANKSHAFTS
Filed Jan. 21, 1937   5 Sheets-Sheet 1
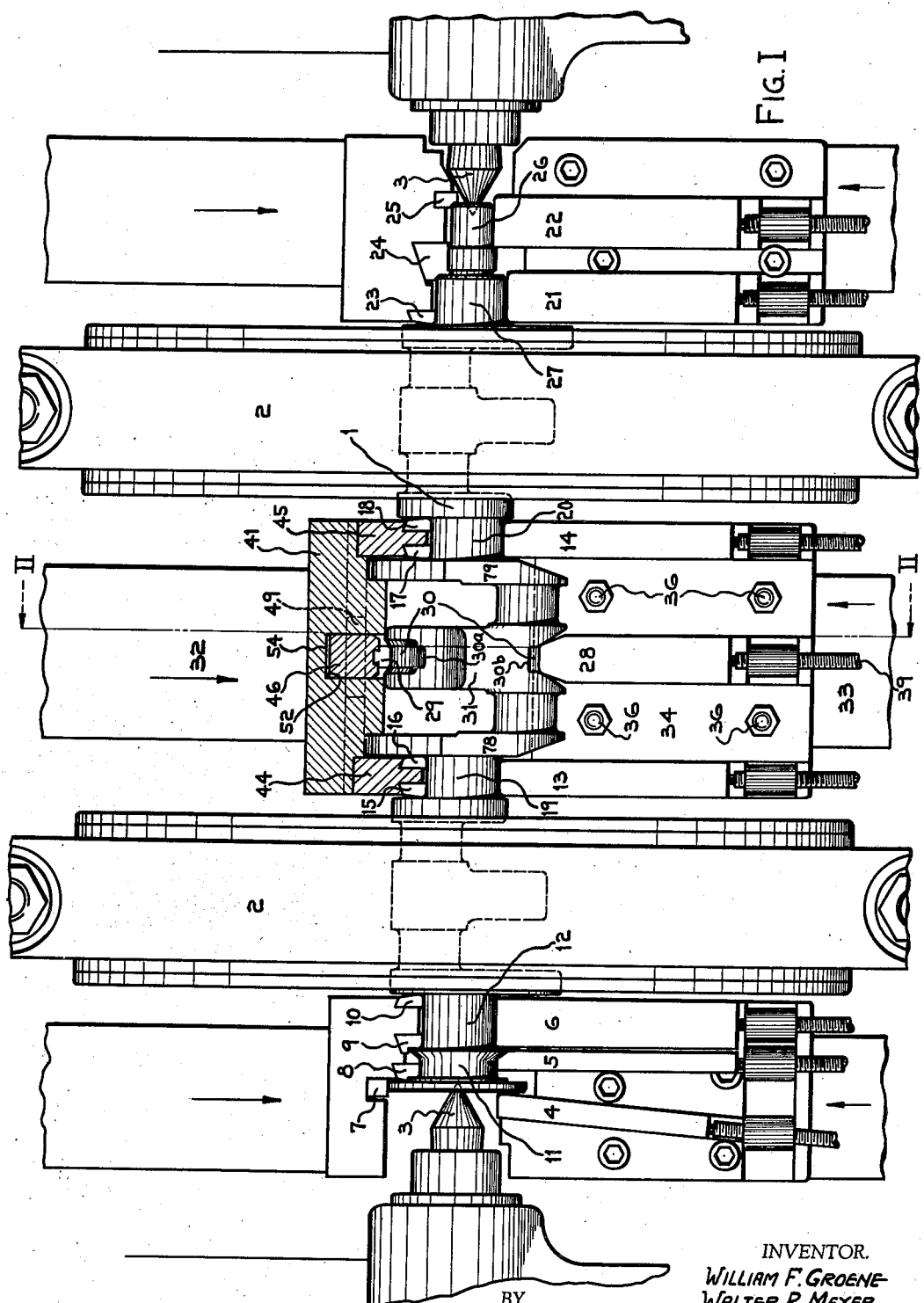
INVENTOR.
WILLIAM F. GROENE
WALTER R. MEYER
BY Willard L. Groene
ATTORNEY.

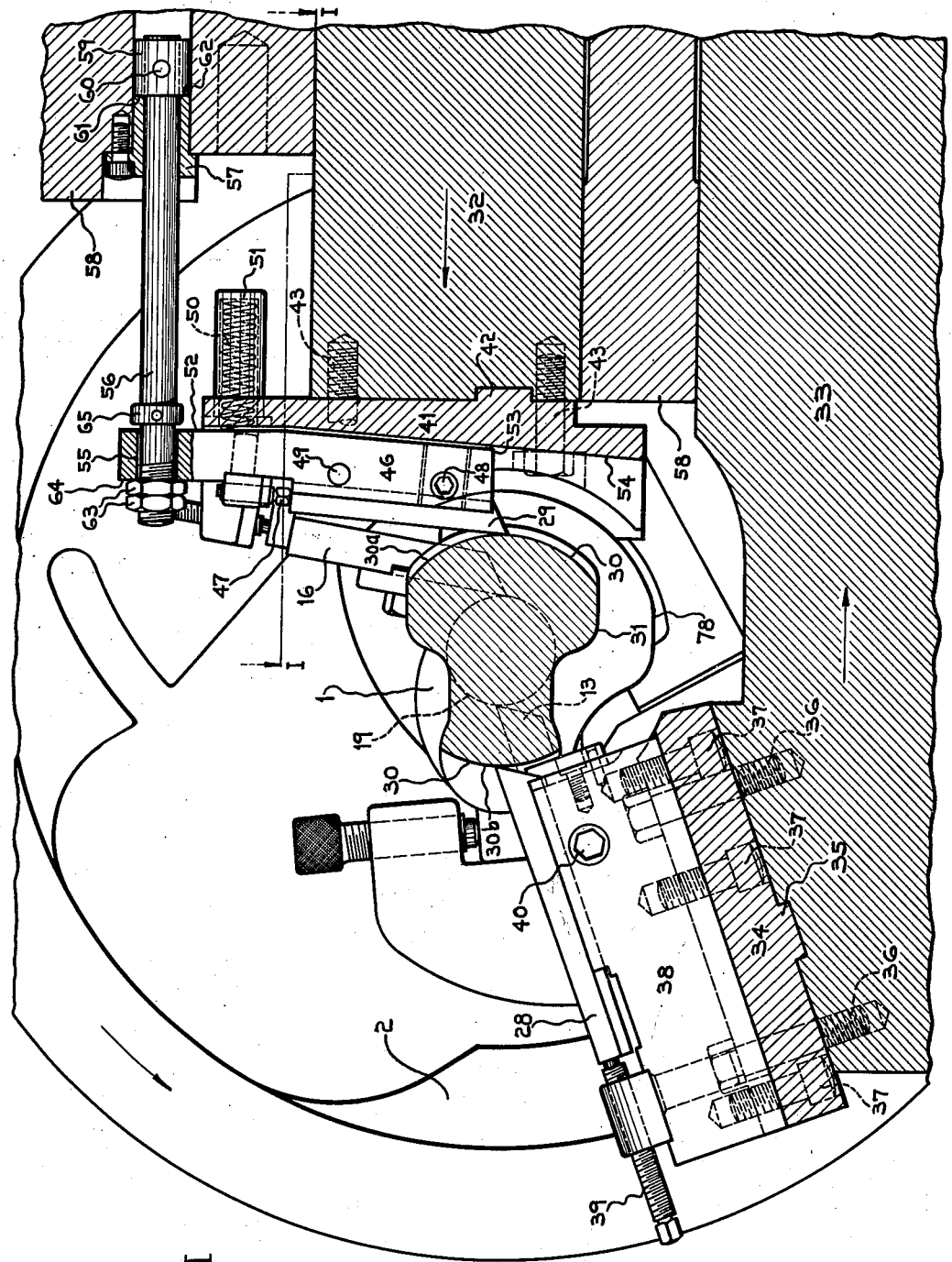

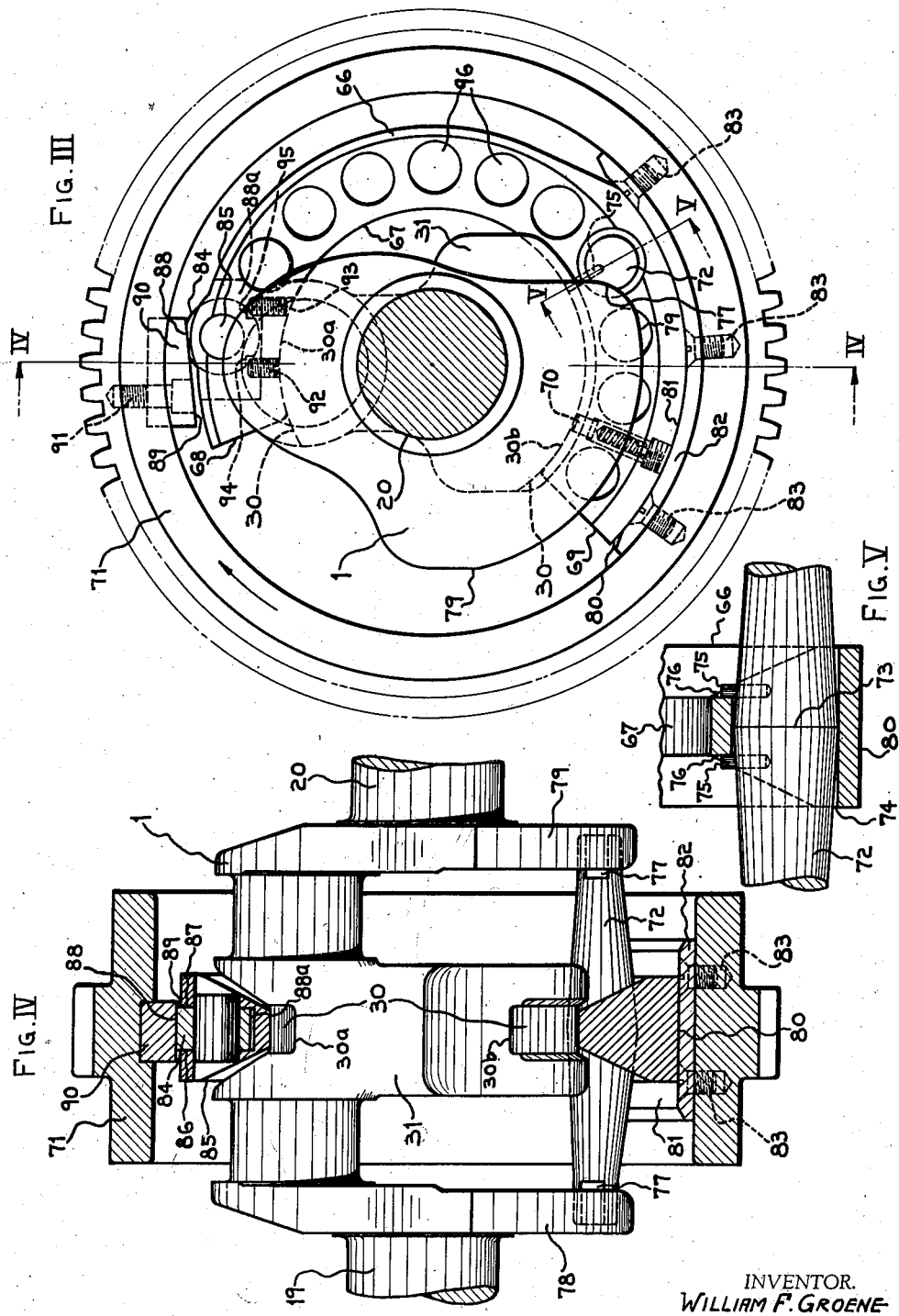

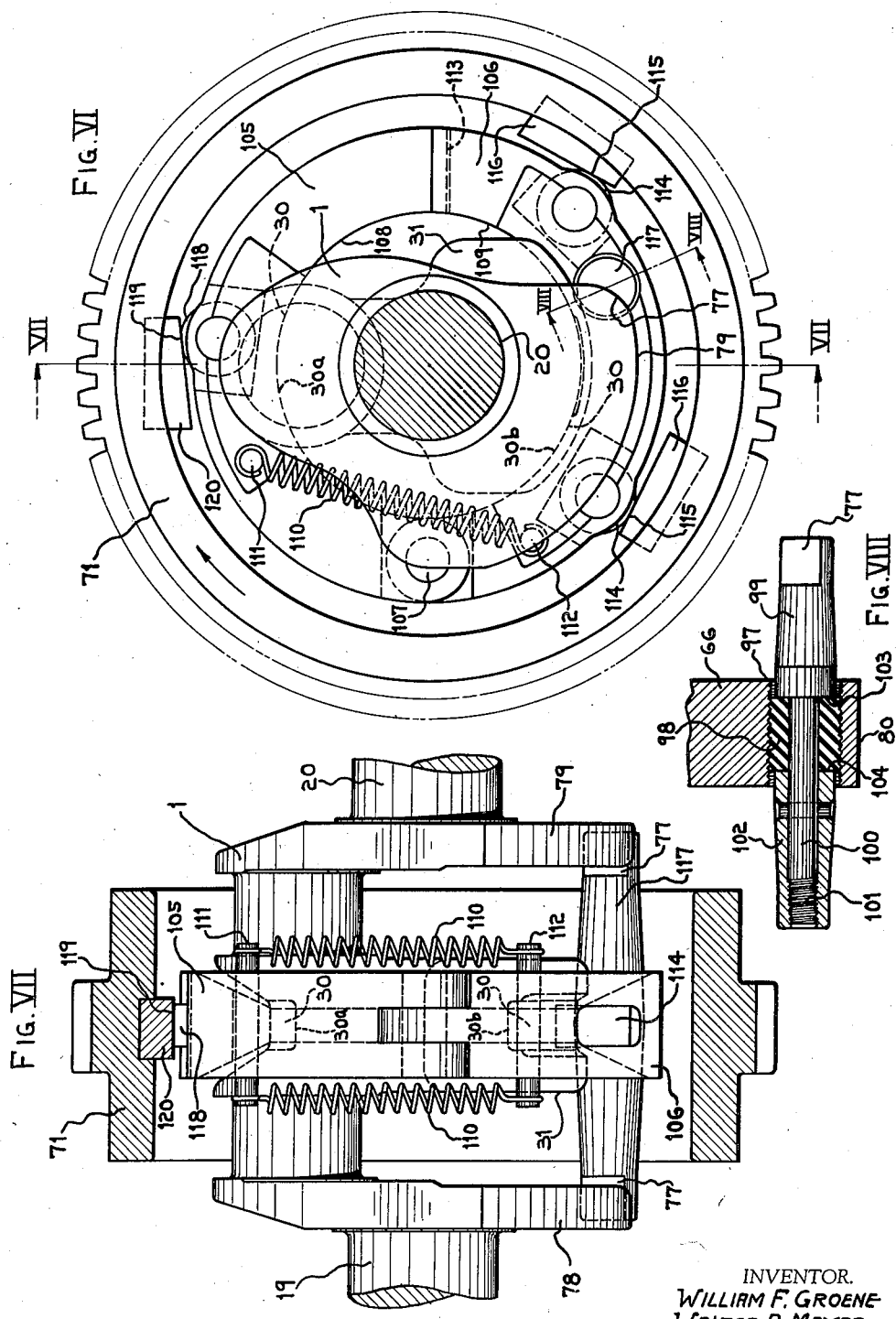

Dec. 27, 1938.  W. F. GROENE ET AL  2,141,466
METHOD OF MACHINING CRANKSHAFTS
Filed Jan. 21, 1937  5 Sheets-Sheet 5
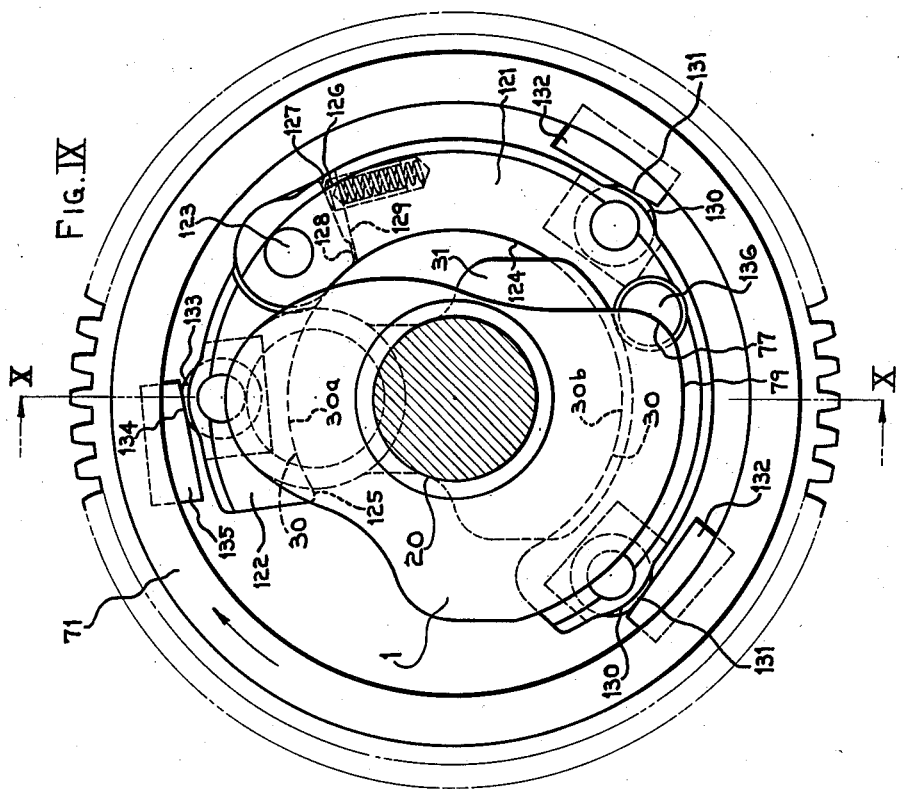
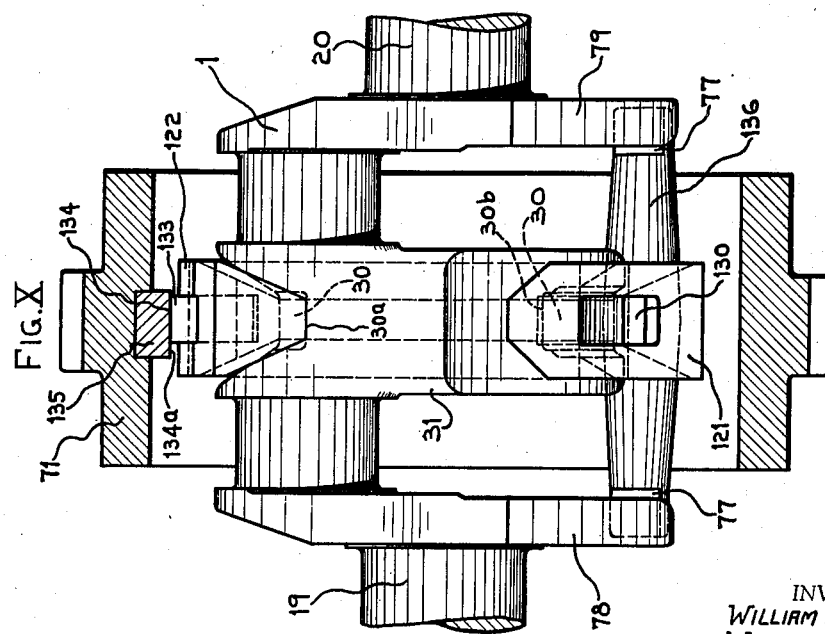
INVENTOR.
WILLIAM F. GROENE
WALTER R. MEYER
BY Willard L. Groene
ATTORNEY.

Patented Dec. 27, 1938

2,141,466

UNITED STATES PATENT OFFICE 2,141,466

METHOD OF MACHINING CRANKSHAFTS

William F. Groene and Walter R. Meyer, Cincinnati, Ohio, assignors to The R. K. Le Blond Machine Tool Company, Cincinnati, Ohio, a corporation of Delaware Application January 21, 1937, Serial No. 121,509

28 Claims. (Cl. 82—1)

This invention pertains to a method and chucks for supporting and rotating crankshafts whereby turning operations may be undertaken on said crankshafts. More particularly, this invention relates to a method and chucks for supporting and rotating a crankshaft whereby the line bearings, including the flange and stub ends of said crankshaft may be machined.

In recent years we have developed the art of turning crankshafts, particularly the finishing of the line bearings and associated parts, to a point where the ultimate accuracy and finish now obtained is equal to, and in some instances, excels rough grinding methods formerly used to finish these portions of the crankshafts.

Our method of accomplishing such results comprises chucking and rotating a crankshaft in a lathe, preferably a lathe of a character shown in Patents Re. 19,905 and Re. 20,090, and in applications Serial Number 20,220 filed May 7, 1935, and Serial Number 104,037 filed Oct. 5, 1936, wherein the line bearings, flange and stub ends of the crankshaft are machined to finish turned dimensions. It is our intention that during such operations means be provided whereby a locating and chucking area or areas will be machined on a web or webs of said crankshaft. It is further our object to rechuck said crankshaft, after the aforementioned machining operations have been completed, in another lathe, as for example, a finishing lathe of the character set forth in our application Serial Number 80,204 filed May 16, 1936, locating and gripping said crankshaft in this last mentioned lathe by means of the locating area or areas machined in said first mentioned lathe, whereby said bearings and associated portions of the crankshaft may be further machined to extreme accuracy and high finish.

Heretofore, in chucking a crankshaft in a lathe of a character shown in our application Serial Number 80,204, locating and chucking means of a character shown in Patent 2,030,020 were utilized. The locating areas required on the crankshaft webs in this former practice had to be machined in a separate and distinct operation requiring a separate machine and considerable handling time. Also, it was found difficult to machine said former locating areas in proper relation to the finish turned line bearings and associated portions so that said premachined bearings and associated portions would run sufficiently true when chucked in the finishing lathe of application Serial Number 80,204.

We have fully overcome the above disadvantages of former methods by providing an arrangement whereby the locating areas (for use in chucking the crankshaft in the said finishing lathe) are machined simultaneously with the finish turning of the line bearings, flange, and stub ends of the crankshaft thereby eliminating all former separate operations necessary to machine said locating areas. And furthermore, since the locating areas of our invention are machined simultaneously with the machining of the line bearings and associated portions in the same chucked position, said locating areas will automatically be in exact alignment with said machined parts so that when rechucked in the finishing lathe of application Serial Number 80,- 204 by means of said locating areas, the bearings and associated surfaces will run true in said latter lathe. This feature eliminates all straightening and locating area machining operations formerly necessary between the finish turning operation and the final finishing lathe, thereby effecting great saving in the cost of the product and much greater accuracy of the finished crankshaft.

A further object of our invention is to provide in a lathe adapted to machine all the line bearings including the flange and stub ends of a crankshaft, cutting tools adapted to machine a peripheral locating area on a web or portion other than a bearing portion of the crankshaft.

We further provide means for applying to said locating area cutting tools from opposite sides of the work piece in such a manner that the tool on one side does rough turning while the tool on the other side finishes said locating area to accurate dimension.

A still further object is to simultaneously machine all the line bearings, flange and stub ends of a six-throw four-line-bearing crankshaft and during said operation to turn a peripheral locating area or areas on the counter-weight web connecting the number three and number four crank pins of said crankshaft.

Another object of our invention is to provide a novel method of chucking a crankshaft for machining the bearing and associated portions thereof which comprises premachining a peripheral locating area or areas on a web of the crankshaft, applying a chucking ring to said area or shaft, and inserting said crankshaft with the chucking ring so applied in the lathe spindle or ring gear whereby said crankshaft is centered and driven by said spindle or ring gear through said chucking ring.

And another object is to locate and center a crankshaft in a chucking device by means of a premachined peripheral locating area or areas on a web or webs of said shaft and to drive said shaft by means engaging a web or webs of said crankshaft at a point or points other than said locating area or areas.

We also intend to provide in a chucking device having a chucking ring adapted to center and locate a crankshaft by engagement with premachined peripheral locating areas on a web of the shaft, equalizing driving means associated with said chucking ring to drive said crankshaft by engagement with a plurality of webs of said shaft.

And it is further our intention to provide resilient driving means in connection with the chucking arrangement set forth above.

Further objects will appear in the course of the following description of the drawings in which:

Figure I is a plan view partly in section on line I—I of Figure II of a center drive lathe showing a crankshaft chucked in the lathe, cutting tools applied to turning the line bearings, flange and stub end of the crankshaft, and cutting tools for machining the peripheral locating area on the counter-weight web between the number three and four pins of said crankshaft.

Figure II is a transverse section on line II—II of Figure I particularly showing the roughing tool and the mechanism for actuating the finishing tool for machining the peripheral locating area on the counter-weight web of the crankshaft.

Figure III is an axial view of a ring gear chucking arangement utilizing the machined peripheral locating area of Figures I and II clearly showing the chucking ring applied to the crankshaft.

Figure IV is a view partly in section on line IV—IV of Figure III clearly showing points of contact between the crankshaft, the chucking ring, and the driving ring gear.

Figure V is an enlarged view in section on line V—V of Figure III showing the mounting of the equalizing driving pin in the chucking ring.

Figure VI is an axial view of a similar chucking arrangement to that of Figure III but in which the chucking ring comprises two complete semi-circular portions.

Figure VII is a view partly in section on line VII—VII of Figure VI particularly showing the arrangement of the springs for actuating the semi-circular portions of the chucking ring.

Figure VIII is a section on line VIII—VIII of Figure VI showing a resilient mounting for the driving pin in the chucking ring.

Figure IX is an axial view of a similar chucking arrangement to that of Figure III but in which the chucking ring has a pivoting arm adapted to engage the crankshaft.

Figure X is a view partly in section on line X—X of Figure IX.

In Figures I and II is shown a six-throw four-line-bearing crankshaft 1 chucked in center drive chucks 2 in a manner preferably as shown in Patent 2,030,020 and having its ends steadied by means of the usual lathe centers 3. Appropriate cutting tools are arranged on opposite sides of the work piece 1 and are fed toward each other to machine the line bearings, flange and stub ends of the crankshaft 1 preferably in a manner set forth in application Serial Number 20,220.

For instance in this particular exemplary disclosure (Figure I) the cutting tools 4, 5, 6, 7, 8, 9, and 10 completely machine the flange end 11 and its associated line bearing 12; the cutting tools 13, 14, 15, 16, 17, and 18 completely machine the respective intermediate line bearings 19 and 20; and the cuttings tools 21, 22, 23, 24, and 25 completely machine the stub end 26 and its associated line bearing 27.

In addition to the tools above mentioned we provide a unique arrangement comprising the tools 28 and 29 which are also adapted to engage the work piece 1 from opposite sides in such a way as to machine a peripheral locating area 30 on the counter-weight web 31 of the crankshaft 1.

The cutting tools 28 and 29 are appropriately mounted on the usual oppositely feeding tool bars comprising the upper tool bar 32 and the lower tool bar 33. On the lower tool bar 33 is fixed a tool block 34 by means of the usual tongue 35 and the bolts 36 which tool block carries the cutting tools 13 and 14. Secured to the tool block 34 by appropriate screws 37 is the tool holder 38 which carries the cutting tool 28. The usual back-up screw 39 is provided for longitudinal adjustment of the tool 28 for proper sizing of the work and the usual clamping means 40 is also provided for locking said tool in adjusted position. Thus it is seen that the tool 28 is fixed on the lower tool bar 33 and feeds toward the work, along with the tools 13 and 14 mounted on the same bar. The tool 28 is adapted to rough out the metal and machine the peripheral locating surface 30 to within a few thousandths of the desired finished size for said locating surface at the time when the tools 13 and 14 have machined the line bearings 19 and 20 respectively to their proper size.

On the upper tool bar 32 is fixed the tool block 41 by means of the usual tongue 42 and the bolts 43. The cutting tools 15—16 and 17—18 are respectively carried in the tool holders 44 and 45 which holders in turn are fixed on the tool block 41.

The cutting tool 29 is mounted on the tool holder 46 which has the usual back-up screw 47 for longitudinal adjustment of the tool 29 and the clamping means 48 for securing said tool in adjusted position. The tool holder 46 is pivotally mounted on the tool block 41 by means of the pin 49 fixed in said block 41. The tool holder 46 and the tool 29 are yieldingly urged away from cutting position relative to the work piece 1 by means of the spring 50 carried in the cylinder 51 fixed to the upper end of the tool block 41, which spring abuts against the rear surface 52 of the tool holder 46 thereby normally holding the lower edge 53 of said tool holder 46 against the surface 54 of the tool block 41 to limit the extent of movement caused by spring 50.

Through the clearance hole 55 in the upper end of the tool holder 46 passes the actuating bar 56 which bar is guided for axial movement in a suitable bushing 57 fixed to the frame 58 of the lathe. To the inner end of the rod 56 is fixed a collar 59 by means of the usual pin 60 which collar 59 limits the outward travel of the rod 56 by contact of the face 61 of the collar 59 with the inner face 62 of the bushing 57. Suitable adjusting nuts 63 are threaded to the outer end of the rod 56 for varying the distance between the face 61 of the collar 59 and the face 64 of the holder 46 for adjusting the tool 29 to properly size the work piece 1. A collar 65 is also fixed on the rod 56 immediately behind the tool holder 46 for returning the rod 56 rearwardly upon return of the tool bar 32 in retracting the tools to thereby provide full access to the chucking devices 2 for unloading and loading work pieces 1 in the lathe.

The operation of the cutting tools 28 and 29 is substantially as follows: As the tool bars 32 and 33 begin their feeding toward the work piece 1 the tool holder 46 has its edge 53 held against the surface 54 of the tool block 41 by the spring 50 as described so that the cutting edge of the tool 29 is positioned a few thousandths of an inch away from the surface being cut by the roughing tool 28. The tool 28, as already stated, has its cutting edge set a few thousandths of an inch away from the true surface to be generated so that after the tool bars 32 and 33 have reached the dwell position for sizing the work the diameter that would be cut by the tool 28 alone would be a few thousandths larger than the desired finished diameter of the peripheral locating area 30. However, just as the tool bars 32 and 33 are about to reach their dwell position further movement of the bar 56 is arrested by engagement of the face 61 of collar 59 with the face 62 of the bushing 57 whereupon the upper end of the tool holder 46 is likewise arrested from further movement by the nuts 63 engaging the surface 64 of the tool holder 46. The tool bars 32 and 33 continue their feeding movement to dwell position which movement of the tool bar 32 causes the pin 49 in the tool block 41 to likewise continue to move toward the work thereby causing pivotal movement of the tool holder 46 about pin 49, compressing spring 50 and relieving the edge 53 from the surface 54 of tool block 41. This movement continues until the tool bars 32 and 33 have reached dwell position at which time the tool holder 46 and its tool 29 have been moved so that the cutting edge of tool 29 is now in position so as to cut to precisely the desired size the peripheral locating surface 30, the cutting edge of tool 28 being not in cutting contact with said surface because it is positioned slightly away from the true finished surface as stated. Withdrawal of the tool bars 32 and 33 to retracted position will of course return the tool 29 by means of the spring 50 to retracted position, ready for another cycle of operation.

The value of this unique tooling arrangement is that we obtain a locating surface on the crankshaft for further operations thereon simultaneously with the machining of the line bearings, flange and stub ends of the shaft. By this arrangement we also automatically produce said locating surface in exact alignment with said portions of the shaft being turned therewith. And it is to be further noted that we obtain a high degree of accuracy for said locating surface by providing the unique arrangement of a roughing and finishing tool set forth above wherein the tool 28 removes substantially all of the metal and the finishing tool 29 comes into operation at nearly the end of the cutting cycle to remove a relatively small amount of metal left by the roughing tool 28 to thereby produce the final finish and accuracy necessary to said peripheral locating surface 30.

In order to utilize to full advantage the peripheral locating surface 30 for subsequent operations on the crankshaft, as for example the precise finishing of the line bearings and associated surfaces, we prefer to use chucking devices of a character illustrated in Figures III to X inclusive.

One form of chucking device is shown in Figures III, IV and V which comprises a chucking ring 66 of somewhat more than semi-circular extent which has a bearing surface 67 adapted to nicely fit around the peripheral locating surface 30 of the crankshaft 1. The chucking ring 66 is so applied to the web 31 (Figure III) by first placing the bearing surface 67 thereof in contact with the portion 30a of the locating surface 30 on web 31 with the end 68 of the ring 66 to the left of the portion 30b and the other end 69 of the ring 66 to the right of the portion 30b of said locating surface 30. The ring 66 is then rotated clockwise (Figure III) to the fully engaged position shown. A spring mounted plunger 70 is yieldingly urged against the portion 30b of the locating surface 30 to prevent the ring from slipping from the fully engaged position and dropping from the work piece as the crankshaft with the chucking ring 66 applied is being loaded or unloaded from the driving spindle or ring gear 71.

An equalizing driving pin 72 having a relatively large diameter 73 at its center and tapering to smaller diameters at its outer ends has its diameter 73 nicely fitting in the bore 74 (Figure V) in the ring 66 and confined from axial movement relative to the ring 66 by means of appropriate pins 75 passing in slots 76 each side of the bearing portion 67 of the ring 66 and fixed in the driving pin 72. The ends of the driving pin 72 are provided with suitable abutment surfaces 77 which drive against the webs 78 and 79 of the crankshaft 1. It can thus be seen that the clockwise movement of the chucking ring 66 relative to the crankshaft 1 is limited by engagement of the driving pin 72 with the webs 78 and 79 of the crankshaft. The driving pin 72 as mounted in the ring 66 has a certain amount of swiveling motion so that both ends will contact the webs 78 and 79 to equalize the driving force on said webs even though said webs are not aligned. The driving force could be applied directly to the web 31 by any suitable projection on the ring 66 engaging said web, but in this particular instance it is found preferable to apply the driving force as close to the line bearings 19 and 20 as possible, which conditions are best met by applying the driving force to both webs 78 and 79 as shown.

After having applied the chucking ring 66 properly to the crankshaft, the crankshaft is inserted axially into the driving spindle or ring gear 71 while held in a position turned slightly in a clockwise direction from the position shown in Figure III. The finished surface 80 on the outside of the chucking ring 66 contacts the mating surface 81 formed by the plate 82 fixed to the ring gear 71 by suitable screws 83 to properly center the chucking ring 66 and thus the crankshaft 1 on its proper center of turning. Substantially diametrically opposite the surface 80 of the ring 66 is mounted a roller 84 on a stud 85 fixed in the ring 66 and confined from axial movement on the stud 85 by the side walls 86 and 87 of the pocket 88a. The roller 84 has a flatted portion 88 adapted to engage the angularly disposed surface 89 of the driving wedge 90 fixed in the ring gear 71 by an appropriate screw 91. Set screws 92 and 93 threaded in the ring 66 project into the cavity 88a and engage into notches 94 and 95 respectively are adapted to be adjusted to permit only sufficient rotation of the roller 84 to allow proper engagement of the flatted portion 88 thereof with the surface 89 of driving wedge 90 while at the same time keeping the roller properly positioned for said engagement when the ring 66 is removed from the ring gear 71 during loading and unloading of the work.

The chucking ring 66 is provided with a series of holes 96 to lighten the ring 66 to facilitate handling and also for the purpose of providing a certain amount of flexibility whereby the end portions 68 and 69 may be pressed toward each other and will return to their normal position when released of such pressure.

After having axially loaded the crankshaft 1 with the chucking ring 66 applied thereto as described, the crankshaft and chucking ring are rotated anti-clockwise (Figure III) on the bearing portion 81 either by manual rotation of the crankshaft or by starting rotation of the driving ring gear 71 in a clockwise direction or normal driving direction, whereupon the flatted portion 88 of the roller 84 is brought into engagement with the angularly disposed surface 89 of the driving wedge 90 to thereby cause the ring gear 71 to drive the chucking ring 66 and the crankshaft 1 in clockwise direction. The engagement of the driving wedge 90 with the roller 84 not only causes the chucking ring 66 to be rotated by the ring gear 71 but said engagement also presses the ends 68 and 69 of said ring gear 71 toward each other to thereby securely bind the crankshaft by firm contact against the surfaces 30a and 30b and, as a result, to force the bearing surface 81 on the ring 66 securely against the bearing 82 in the ring gear 71. Thus it can be seen that when fully chucked in the device above described the crankshaft is held in positive engagement with the driving spindle or ring gear 71 so that the work is positively held in proper centered position and positively driven in cutting direction so that no chatter or irregularity will result in the finished work surface machined.

It is further to be noted that, aside from the manual placement of the chucking ring 66 on the crankshaft and loading the crankshaft with the chucking ring 66 thereon in the ring gear 71, the chuck is fully automatic to center, positively hold and drive the crankshaft when the chucking device is actuated to rotate the work piece.

Noting Figure VIII, we may also employ a combined equalizing and resilient mounting for the driving pin 72 in place of the mounting of Figure V. In the threaded bore 97 formed in the chucking ring 66 is placed a composition bushing 98 of resilient composition material such as rubber. The driving pin in this case comprises the tapered end portion 99 having an abutment 77 on its end for crankshaft web engagement and has an integral smaller shaft portion 100 snugly fitting in the bore of the composition bushing 98 and projecting beyond and having a threaded end portion 101 to which is applied a member 102 having an outside shape similar to the portion 99. Upon screwing up the portion 102 on the shaft portion 100 the composition bushing 98 is compressed between the face 103 of portion 99 and face 104 of member 102 thus securing the bushing to the driving pin assembly and also squeezing the bushing tightly into the threaded bore 97 to prevent its rotation or axial movement therein. A suitable rivet is passed through member 102 and the shaft portion 100 to secure them permanently together. Thus it can be seen that since there is no metallic connection between the chucking ring 66 and the driving pin assembly described, a resilient driving connection is provided between the chucking device and work piece and also the resilience of the mounting bushing permits sufficient movement of the driving pin assembly to permit equalizing driving action of said pin on the webs 78 and 79 of the crankshaft 1. The value of this structure is that the crankshaft may be driven without distortion and at the same time be driven by a resilient or cushioned driving means to prevent chatter and the like in the surfaces of the work being finished.

Another form of chucking device is shown in Figures VI and VIII in which the chuck ring comprises two semi-circular portions 105 and 106 hinged together on a suitable pin 107 each having inner bearing surfaces 108 and 109 respectively which engage the portions 30a and 30b of the peripheral locating area 30 on the crankshaft 1. Tension springs 110 connected to the pin 111 fixed in member 105 and to the pin 112 fixed in the member 106 serve to hold the members 105 and 106 clamped about the crankshaft as shown in Figure VI when the center line of the springs 110 is between the axis of the hinge pin 107 and the axis of rotation of the clamping ring when around the work piece and to hold the members 105 and 106 apart when opened to release the crankshaft therefrom. A clearance space 113 is provided at the outer ends of the members 105 and 106 so that the portions 30a and 30b on the crankshaft form the limiting means for the closed position of the clamping ring segments.

In the member 106 is mounted a pair of rollers 114 in a like manner to that of the roller 84 in Figure III and having flatted portions 115 adapted to engage the driving wedge 116 fixed in the ring gear 71. A driving pin 117 having web engaging portions 77 for contacting the webs 78 and 79 of the crankshaft 1 is mounted in the member 106 by either of the arrangements shown in Figures V or VIII. The member 105 also has a roller 118 similarly mounted as the roller 84 in Figure III which has a flatted portion 119 adapted to engage the driving wedge 120 fixed in the ring gear 71.

To render this chucking arrangement effective, the two semi-circular portions 105 and 106 are closed about the crankshaft 1 with the driving pin 117 engaging the crankshaft webs 78 and 79 substantially as shown in Figures VI and VII, the springs 110 holding the clamping ring on the crankshaft while it is being loaded axially of the ring gear 71. The crankshaft is passed in the ring gear 71 in a slightly more clockwise position than that shown in Figure VI, the crankshaft then either being rotated counterclockwise or the ring gear 71 rotated clockwise to bring the rollers and driving wedges into engagement. By so doing it can be seen that the crankshaft is positively clamped between the members 105 and 106 due to the combined wedging action of the rollers and driving wedges and it can also be seen that the crankshaft is positively centered, held and driven automatically upon rotation of the ring gear 71 as in the former example of Figures III, IV, and V.

Still another embodiment of our invention is shown in Figures IX and X. In this arrangement the clamping ring comprises a semi-circular member 121 and a hinged member 122 pivotally mounted on the pin 123 in the member 121. The member 121 has a bearing portion 124 adapted to engage portion 30b of the crankshaft while hinged member 122 has a bearing portion 125 adapted to engage the portion 30a of the crankshaft. A spring urged plunger 126 abuts against the surface 127 of the member 122 to yieldingly urge the member 122 in engagement with the portion 30a of the crankshaft so as to hold the chucking ring in place around the crankshaft. A suitable abutment 128 on member 122 strikes the surface 129 on the member 121 to prevent too great an inward movement of member 122 by the spring urged plunger 126 when a crankshaft is not in the chucking ring.

In the member 121 are mounted rollers 130 in a manner substantially as shown for the roller 84 in Figure III, which have flatted portions 131 adapted to engage driving wedges 132 fixed in the ring gear 71. A roller 133 is similarly mounted in the member 122 having a flatted portion 134 adapted to engage the surface 134a of the driving wedge 135 fixed in the ring gear 71. The usual driving pin 136 is also mounted in the member 121 by either of the arrangements set forth in Figures V or VIII.

To place this type of chucking ring on the crankshaft, the hinged member 122 is swung outwardly compressing the spring plunger 126. The crankshaft is then placed on the ring 121 with the portion 30b contacting the bearing portion 124 and with the driving pin 136 properly engaging the crankshaft webs 78 and 79. When in such position the spring urged plunger 126 will properly hold the member 122 against the portion 30a of the crankshaft to keep the chucking ring in place as the crankshaft is being loaded or unloaded from the driving ring 71 in a manner similar to that of the chucking device shown in Figure VI. It can be seen that upon rotation of the driving ring gear 71 in clockwise direction (Figure IX), the driving wedge 135 bearing against roller 133 will urge the member 122 toward portion 30a of the crankshaft and that the driving wedges 132 will likewise urge the member 121 toward portion 30b of the crankshaft thereby securely locking the crankshaft in the chucking device. This chucking arrangement similarly provides automatic means for centering, positively holding and driving the work piece as the driving ring gear 71 is rotated.

It is also to be noted that while the various rollers of the chucking rings of the examplary disclosures have flatted portions engaging the driving wedges, this is not necessarily essential as completely cylindrical rollers having free rotation might be used where greater wedging and clamping action is desired and where it is desired to more easily disengage the chucking ring from the driving spindle or ring gear.

Having fully set forth and described our invention, what we claim is:

1. A method of machining crankshafts comprising chucking and rotating a crankshaft in a lathe, machining bearing portions and a peripheral locating area on a web of said crankshaft, removing said crankshaft from said lathe, and rechucking said crankshaft in another lathe by means of said previously machined locating area whereby further machining operations may be undertaken on said crankshaft.

2. A method of machining crankshafts comprising chucking and rotating a crankshaft in a lathe, machining bearing portions and peripheral locating areas on a web of said crankshaft, removing said crankshaft from said lathe, and rechucking said crankshaft in another lathe by means of said previously machined locating areas whereby further machining operations may be undertaken on said crankshaft.

3. A method of machining crankshafts comprising chucking and rotating a crankshaft in a lathe, machining the line bearings and a peripheral locating area on a web of said crankshaft, removing said crankshaft from said lathe, and rechucking said crankshaft in another lathe by means of said previously machined locating area whereby further machining operations may be undertaken on said crankshaft.

4. A method of machining crankshafts comprising chucking and rotating a crankshaft in a lathe, machining the line bearings, the flange end, the stub end, and a peripheral locating area on a web of said crankshaft, removing said crankshaft from said lathe, and rechucking said crankshaft in another lathe by means of said previously machined locating area whereby further machining operations may be undertaken on said crankshaft.

5. A method of machining the line bearings, flange end, and stub end of a crankshaft comprising chucking and rotating said crankshaft in a center drive lathe, simultaneously machining all of the line bearings, flange end, stub end, and a peripheral locating area on a web of said crankshaft, removing said crankshaft from said lathe, and rechucking said crankshaft in another lathe by means of said previously machined locating area whereby further machining operations may be undertaken on the line bearings, flange end, and stub end of said crankshaft.

6. A method of machining the line bearings, flange end, and stub end of a crankshaft comprising, chucking and rotating a crankshaft in a double center drive lathe, simultaneously machining all of the line bearings, flange end, stub end, and a peripheral locating area on a web of said crankshaft positioned intermediate the chucking devices of said lathe, removing said crankshaft from said lathe, and rechucking said crankshaft in another lathe by means of said previously machined locating area whereby further machining operations may be undertaken on the line bearings, flange end, and stub end of said crankshaft.

7. A method of machining the line bearings, flange end, and stub of a six-throw four-line bearing crankshaft comprising, chucking and rotating said crankshaft in a lathe, simultaneously machining all the line bearings, flange end, stub end, and a peripheral locating area on the counter-weight web connecting number three and number four crank pins, removing said crankshaft from said lathe, and rechucking said crankshaft in another lathe by means of said previously machined locating area whereby further machining operations may be undertaken on the line bearings, flange end, and stub end of said crankshaft.

8. As a novel article in an incomplete stage of a novel method of manufacture of the completed article, a work piece for forming a crankshaft, comprising a cylindrical portion and a web adjacent to the cylindrical portion, said work piece being prepared for chucking to turn the cylindrical portion, in that it is provided with a finished peripheral area on the web, concentric with the axis of rotation of the cylindrical portion to be turned.

9. As a novel article in an incomplete stage of a novel method of manufacture of the completed article, a work piece for forming a crankshaft, comprising cylindrical portions and webs adjacent the respective cylindrical portions, said work piece being prepared for chucking to turn the cylindrical portions, in that it is provided with finished peripheral areas on a plurality of webs spaced longitudinally of the shaft, said peripheral areas being formed concentric with the axis of rotation of the cylindrical portions to be turned.

10. A method of finishing the line bearings, flange end, and stub end of a crankshaft comprising, chucking and rotating the crankshaft in a lathe, turning the line bearings, flange end, and stub end to finish turned dimensions and accurately machining a locating area on a web of said shaft, removing said crankshaft from said lathe, rechucking said crankshaft in another lathe by means of said locating area whereby said bearings, flange end, and stub end of said crankshaft may be further machined to extreme accuracy and high finish.

11. A method of chucking a crankshaft for machining the bearing and associated portions thereof comprising, pre-machining a peripheral locating area on a web of said crankshaft, applying a chucking ring to said area, and inserting said crankshaft with said ring so applied in a lathe spindle whereby said crankshaft is chucked in said spindle.

12. A method of chucking a crankshaft for machining the bearing and associated portions thereof comprising, pre-machining a peripheral locating area on a web of said crankshaft, applying a chucking ring to said area, and inserting said crankshaft with said ring so applied in a lathe spindle whereby said crankshaft is centered and driven by said spindle through said chucking ring.

13. A method of chucking a crankshaft for machining the bearing and associated portions thereof comprising, pre-machining peripheral locating areas on webs of said crankshaft, applying chucking rings to said areas, and inserting said crankshaft with said rings so applied in a lathe spindle or spindles whereby said crankshaft is centered, axially aligned, and driven by said spindle or spindles through said chucking rings.

14. A chucking device for crankshafts comprising, a rotatable work spindle, a chucking ring applicable to a finished locating area on a crankshaft, and abutment areas on said spindle adapted to engage said chucking ring whereby said chucking ring is located and driven by said spindle and said crankshaft is gripped by said chucking ring.

15. A chucking device for crankshafts comprising, a rotatable work spindle, a chucking ring applicable to a finished locating area on a crankshaft, abutment areas on said spindle adapted to engage said chucking ring whereby said chucking ring is located and driven by said spindle, and abutment means on said chucking ring whereby said crankshaft is located and driven by said chucking ring.

16. A chucking device for crankshafts comprising, a rotatable work spindle, a chucking ring applicable to a finished locating area on a crankshaft, abutment areas on said spindle adapted to engage said chucking ring whereby said chucking ring is located and driven by said spindle, and means on said chucking ring to engage said crankshaft at a plurality of axially spaced points whereby said crankshaft is located and driven by said chucking ring.

17. A chucking device for crankshafts comprising, a rotatable work spindle, a chucking ring applicable to a finished locating area on a crankshaft, abutment areas on said spindle adapted to engage said chucking ring whereby said chucking ring is located and driven by said spindle, and equalizing driving means mounted on said ring and adapted to engage a plurality of webs of said crankshaft whereby said crankshaft is driven by said chucking ring.

18. A chucking device for crankshafts comprising, a rotatable work spindle, a chucking ring applicable to a finished locating area on a crankshaft, abutment areas on said spindle adapted to engage said chucking ring whereby said chucking ring is located and driven by said spindle, and resilient driving means mounted on said ring adapted to engage said crankshaft whereby said crankshaft is resiliently driven by said chucking ring.

19. A chucking device for crankshafts comprising, a rotatable work spindle, a chucking ring applicable to a finished locating area on a crankshaft, abutment areas on said spindle adapted to engage said chucking ring whereby said chucking ring is located and driven by said spindle, and combined equalizing and resilient driving means in said ring whereby said crankshaft is driven by said chucking ring.

20. A chucking device for crankshafts comprising, a rotatable work spindle or spindles, chucking rings applicable to finished locating areas on a crankshaft, abutment areas on said spindle or spindles adapted to engage said chucking rings whereby said chucking ring is located and driven by said spindle or spindles and said crankshaft is gripped by said chucking rings.

21. A chucking device for crankshafts comprising, a rotatable work spindle, and a chucking ring applicable to finished locating areas on a crankshaft comprising a member of semi-circular extent adapted to engage about a cylindrical finished area of said crankshaft and having its ends compressible toward said crankshaft, and means whereby said ends are compressed to grip said crankshaft when loaded in and driven by said work spindle.

22. A chucking device for crankshafts comprising, a rotatable work spindle, and a chucking ring applicable to finished locating areas on a crankshaft comprising a member of semi-circular extent adapted to engage a portion of a cylindrical finished area of said crankshaft and having a smaller segmental member pivotally mounted at one end of said semi-circular member adapted to engage another portion of said finished area, and means whereby said members are held in firm engagement with said finished area when said crankshaft is loaded in and driven by said work spindle.

23. A chucking device for crankshafts comprising, a rotatable work spindle, and a chucking ring applicable to finished locating areas on a crankshaft comprising a member of semi-circular extent adapted to engage a portion of a cylindrical finished area of said crankshaft, another member of semi-circular extent having an end hinged to an end of said first mentioned semi-circular member adapted to engage another portion of said finished area, and means whereby said members are held in firm engagement with said finished area when said crankshaft is loaded in and driven by said work spindle.

24. A chucking device for crankshafts comprising, a rotatable work spindle, a chucking ring applicable to finished locating areas on a crankshaft cooperating with said spindle as a supporting and driving means for said crankshaft, and means on said chucking ring to hold said ring applied to said crankshaft while being inserted or removed from said work spindle.

25. A method of machining crankshafts comprising the steps of, (a) machining bearing portions and a peripheral locating area on a web of said crankshaft, (b) chucking said crankshaft by means of said previously machined locating area, and (c) performing further machining operations on said crankshaft.

26. A method of machining crankshafts comprising the steps of, (a) chucking and rotating a crankshaft in a lathe, (b) machining bearing portions and a peripheral locating area on a web of said crankshaft, (c) chucking said crankshaft by means of said previously machined locating area, and (d) performing further machining operations on said crankshaft.

27. A method of machining line bearing portions of crankshafts comprising the steps of, (a) machining line bearing portions and a peripheral locating area on a web of said crankshaft, (b) chucking said crankshaft by means of said previously machined locating area, and (c) performing further machining operations on the line bearing portions of said crankshaft.

28. A method of machining the line bearing portions of crankshafts comprising the steps of, (a) rough machining the line bearing portions and a peripheral locating area on a web of said crankshaft, (b) chucking said crankshaft by means of said previously machined locating area, and (c) performing finish machining operations on the line bearing portions of said crankshaft.

WILLIAM F. GROENE.
WALTER R. MEYER.